(12) United States Patent
Madni et al.

(10) Patent No.: US 6,772,646 B1
(45) Date of Patent: Aug. 10, 2004

(54) DIFFERENTIAL CAPACITIVE TORQUE SENSOR

(75) Inventors: Asad M. Madni, Los Angeles, CA (US); Robert K. Hansen, Burbank, CA (US); Jim B. Vuong, Northridge, CA (US)

(73) Assignee: BEI Sensors & Systems Company, Inc., Sylmar, CA (US)

( * ) Notice: Subject to any disclaimer, the term of this patent is extended or adjusted under 35 U.S.C. 154(b) by 71 days.

(21) Appl. No.: 09/904,067

(22) Filed: Jul. 11, 2001

(51) Int. Cl.[7] .................................................. G01L 3/14
(52) U.S. Cl. ................................................... 73/862.337
(58) Field of Search ..................... 73/862.337, 862.333, 73/862.335, 116, 309, 818, 862.33; 340/870.37; 361/298.5, 301.4, 298; 60/39.15; 438/692; 173/20; 318/662; 29/25.35

(56) References Cited

U.S. PATENT DOCUMENTS

| | | | | |
|---|---|---|---|---|
| 3,595,074 A | * | 7/1971 | Johnson .................... 73/136 R |
| 4,238,781 A | * | 12/1980 | Vercellotti et al. ..... 340/870.37 |
| 4,244,219 A | | 1/1981 | Takahashi et al. ............ 73/309 |
| 4,499,465 A | * | 2/1985 | Tanaka et al. ......... 340/870.37 |
| 4,597,480 A | * | 7/1986 | Schwarz ....................... 192/54 |
| 4,680,976 A | | 7/1987 | Lustenberger et al. ... 73/862.33 |
| 4,941,363 A | * | 7/1990 | Doemens et al. ......... 73/862.33 |
| 4,961,055 A | * | 10/1990 | Habib et al. ................ 324/662 |
| 5,046,371 A | * | 9/1991 | Kronberg ................. 73/862.33 |
| 5,099,386 A | * | 3/1992 | Stokes et al. ............... 361/298 |
| 5,598,153 A | * | 1/1997 | Brasseur et al. ....... 340/870.37 |
| 6,218,803 B1 | * | 4/2001 | Montagu et al. ............ 318/662 |
| 6,442,812 B1 | * | 9/2002 | Kovacich et al. .......... 29/25.35 |

OTHER PUBLICATIONS

Nwagboso, Christopher, "Automotive Sensory Systems", 1993, Chapter 3.1 (pp. 47–60).
Christopher O. Nwagboso, "Automotive Sensory Systems," Chapman & Hall, 1992 (pp. 3.1–3.10).

* cited by examiner

Primary Examiner—Edward Lefkowitz
Assistant Examiner—Octavia Davis
(74) Attorney, Agent, or Firm—Coudert Brothers LLP

(57) ABSTRACT

A differential capacitive torque sensor for a continuously rotating shaft such as the steering column of an automobile provides an apertured metal cage shielding a dielectric rotor. They are respectively mounted on opposite sides of a split shaft connected by a torsion bar. The relative rotation of the apertured conductive plates and the rotor change the overall differential capacitance of the system to proportionally indicate clockwise or counter-clockwise torque.

8 Claims, 4 Drawing Sheets

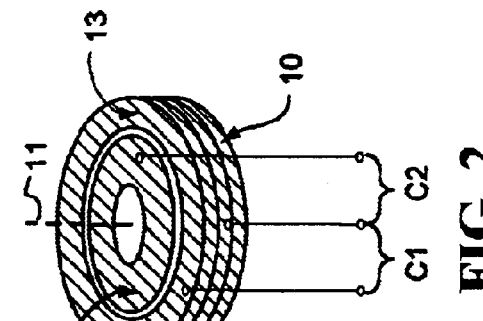
FIG. 1A
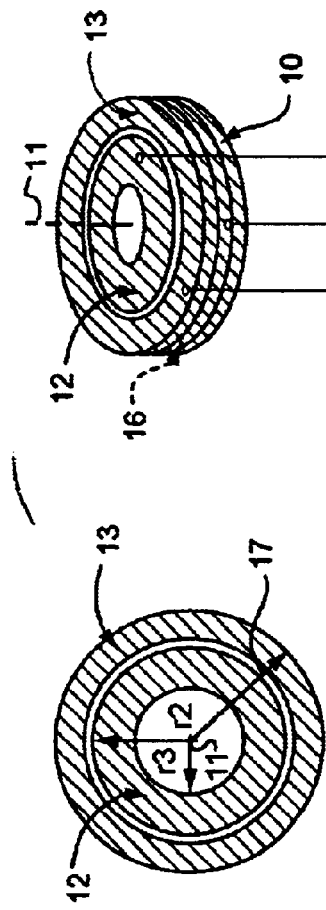
FIG. 1B
FIG. 2
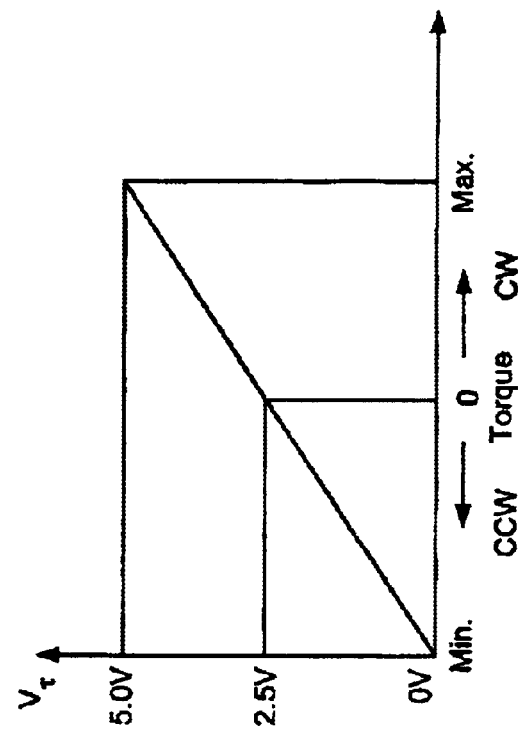
FIG. 4
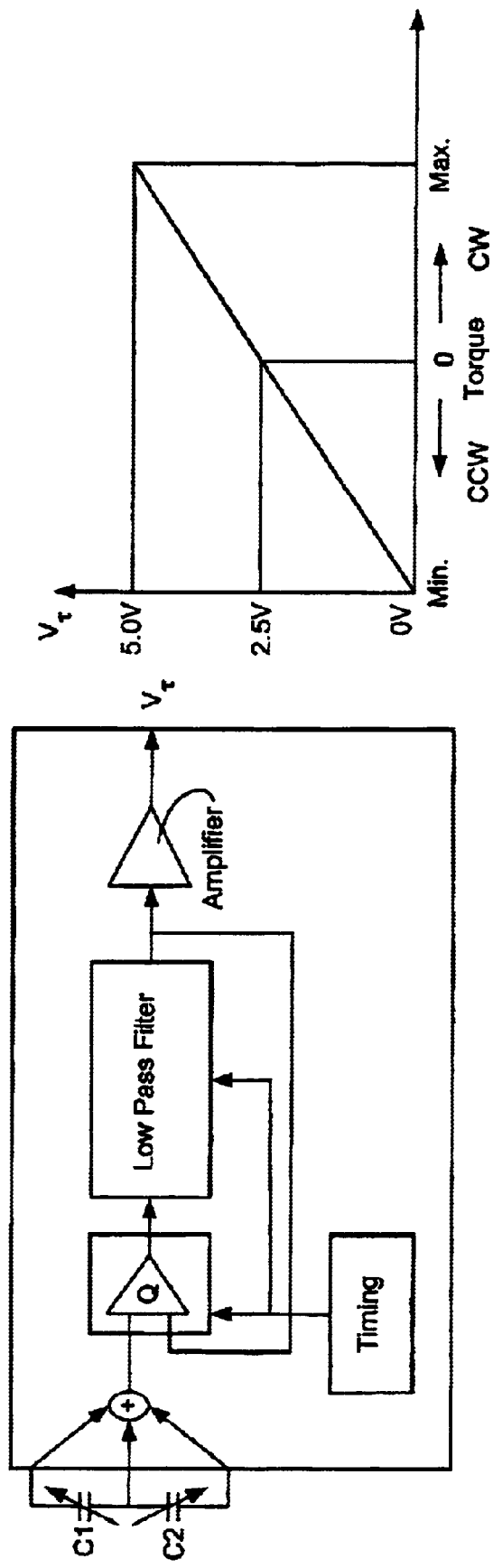
FIG. 3

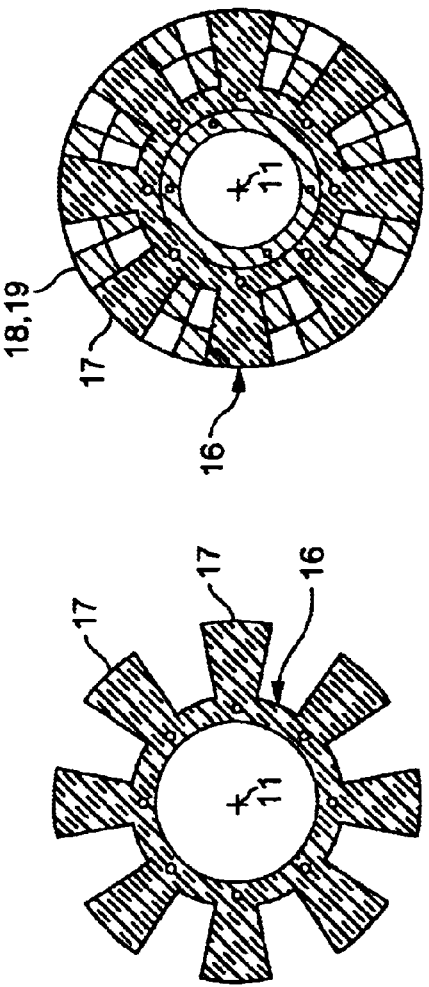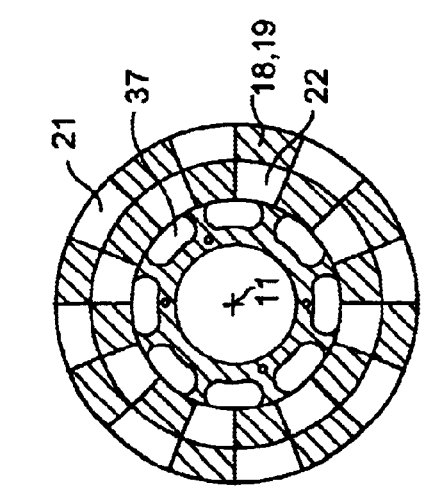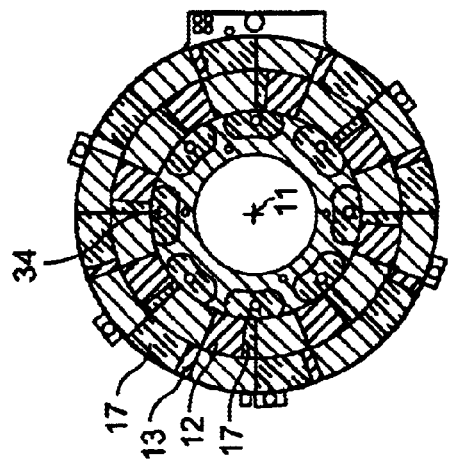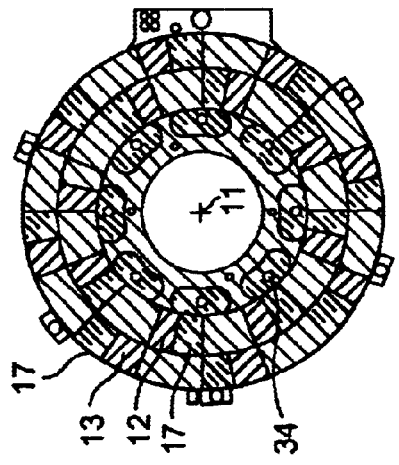

US 6,772,646 B1

DIFFERENTIAL CAPACITIVE TORQUE SENSOR

The present invention is directed to a differential capacitive torque sensor for a continuously rotating shaft and more specifically to a sensor for automotive applications including steering.

BACKGROUND OF THE INVENTION

Recent requirements from the automotive industry for reduced engine power consumption have dictated the replacement of the Power Steering Hydraulic Pump with a much more efficient electric motor geared to the steering shaft to assist the steering effort. The main problem has been sensing the effort being applied by the driver so as to know how much to assist in the steering effort.

The automotive industry attempted, with little success, to find an inexpensive method of accurately sensing the torsion in the then available 1" length of the ¾" diameter steel steering shaft. The solution was to include a torsion bar within the steering shaft, thereby allowing more torsional flexibility. This movement can now be sensed using far less expensive means to determine how much effort is being applied to the steering wheel by the driver, and in turn can dictate how much power to apply to the motor for assistance.

This sensing could be accomplished with resistive elements (potentiometers), but this is a contacting technology which is prone to wear, and is electrically noisy. A noncontacting solution is therefore very much preferable. Another possibility is the use of optical encoders. While this would also perform the function, it is prohibitively expensive (especially absolute optical encoders), and the use of the light source is discouraged due to reliability considerations. In general, these and other techniques for measuring torque, currently utilize two angular displacement sensors, one on each side of the torsion rod.

A disadvantage of the differential angular displacement method is that there are two separate output sensors and the twist angle is the difference between the output signals. This is not very accurate. One solution to this problem is shown in the Lustenberger, U.S. Pat. No. 4,680,976 which utilizes an electromagnetic technique with opposed coils. This is subject to radio interference from external sources and its accuracy may not be sufficient.

OBJECT AND SUMMARY OF INVENTION

It is therefore an object of the present invention to provide a differential capacitive torque sensor.

In accordance with the above object there is provided a differential capacitive torque sensor for a continuously rotating shaft where the shaft is split into first and second halves by a buried torsion bar comprising a dielectric disk having a plurality of spokes mounted for rotation with a first half of said shaft.

A pair of first and second apertured conductive disks cage the dielectric disk and are mounted for rotation with the second half of the shaft the cage shielding portions of the spokes of said dielectric disk in proportion to applied shaft torque. A pair of concentric capacitor plate rings lying in a common plane encircle the first shaft half and are juxtaposed with the first apertured conductive disk. An opposed capacitor plate encircles the second shaft half and is juxtaposed with the second apertured conductive disk. Electrical bridge means compare the capacitances formed between the pair of concentric rings and the opposed capacitor plate for determining the applied shaft torque.

BRIEF DESCRIPTION OF DRAWINGS

FIGS. 1A and 1B are plan views of two capacitor portions of the present invention.

FIG. 2 is a perspective view of the combination of FIGS. 1A and 1B as they would be actually used on a shaft whose torsion is to be determined.

FIG. 3 is a schematic diagram showing how the capacitances of FIG. 2 are processed.

FIG. 4 is a diagram illustrating the operation of FIG. 3.

FIG. 5 is a plan view of a portion of the invention.

FIG. 6 is a plan view of another portion of the invention.

FIG. 7 is a plan view showing a combination of FIGS. 5 and 6.

FIG. 8 is a plan view showing a combination of FIGS. 7 and 1B in a zero torque condition.

FIG. 9 is a plan view similar to FIG. 8 in a maximum torque condition.

DETAILED DESCRIPTION OF PREFERRED EMBODIMENT

Figure 10:
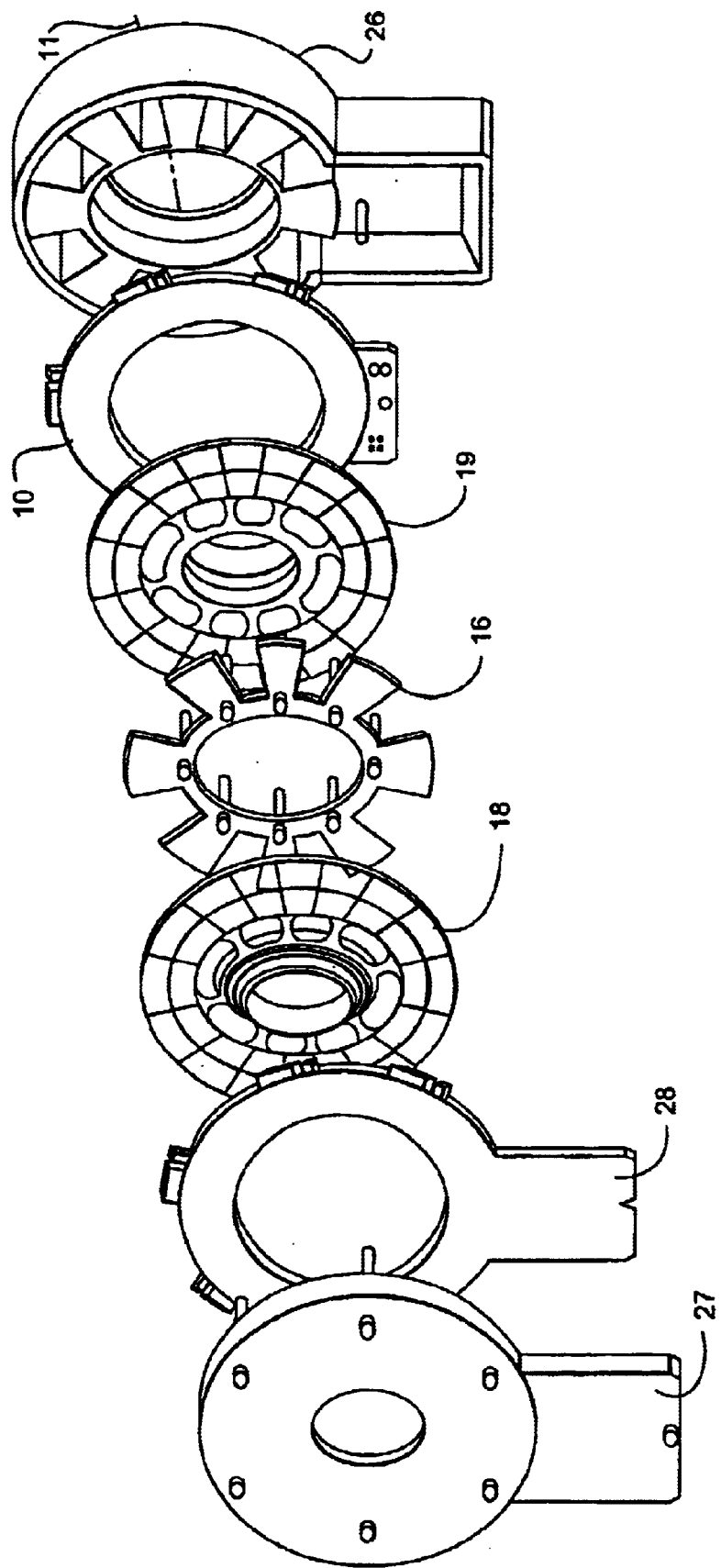
FIG. 10 is an exploded perspective view showing how the components of the invention would be installed on a shaft.

Capacitive sensing technology is well known. The value of a capacitor depends on the permittivity of the dielectric material between the capacitor plates, the area of the plates and the distance between the two plates. Any one of these parameters may be used in the sensing process.

A displacement sensor can be constructed by sliding a piece of dielectric material in an out of the parallel plates of a capacitor. This is not suitable for real life applications due to environmental effects such as humidity. The dielectric constant of air is very close to one in dry conditions. However, when the humidity increases, the media will no longer be pure air but a mixture of air and water molecules which will have a dielectric constant greater than one resulting in significant displacement errors. In order to overcome this problem, it is known to utilize a ratiometric capacitive sensor. Here side-by-side parallel plate capacitors are arranged and the length of the movable dielectric material is larger than the length of any individual capacitor. The character of this construction can be defined by the ratiometric formula of the ratio of the two capacitances. In this construction, the movement of the dielectric between the plates is desired to be sensed. Such can be done by the capacitive sensor signal conditioning circuit illustrated in FIG. 3 which is commercially available. Here the voltage output $V_T$ is the ratio of the difference and the sum of the individual capacitances times a constant. Since the sensor is based on a ratiometric arrangement environmental effects such as humidity, temperature, etc. will have a minimal effect on the accuracy due to the fact that the value of C1 and C2 will track (increase and decrease proportionally) each other. The foregoing is only suitable for a linear displacement type of sensor. However, using the foregoing technique, rotary capacitive sensors are possible but are limited to a maximum angle of 180°. Such a construction would have one common circular capacitive plate with a split capacitive plate in half circles sandwiching a rotary dielectric. Where it is desired to sense the torque of, for example, rotating machinery or steering wheel of an automobile which was several turns from lock to lock, such a construction is not usable. FIGS. 1A, 1B and 2 illustrate the plates of the capacitor of the present invention without the inserted dielectric. FIG. 1A shows an annular or ring-type capacitor plate 10 encircling a shaft 11 (only the axis being shown of the shaft). This is opposed to a pair of concentric capacitor plate rings 12 and 13 lying in the same plane with each other and encircling again the shaft axis 11. As discussed above, as illustrated in FIG. 11, they would be mounted on the shaft 11 in close proximity but with a dielectric 16 there between. As illustrated in FIG. 2, the capacitance C1 occurs between plate 10 and the outer concentric ring 13 and the capacitance C2 occurs between the plate 10 and the inner ring 12. Ring plates 12 and 13 should desirably have equal areas in order to provide a balanced capacitive output (that is equal capacitances C1 and C2) at zero torque. Equal areas can easily be provided by simple geometry. Referring to FIG. 1B where the three pertinent radii are shown for equal area capacitive plates and the following formula is applicable:

$$r_2 = \sqrt{\frac{r_1^2 + r_3^2}{2}}.$$

FIG. 6 illustrates at 16 a dielectric disk having a plurality of sectors or spokes 17 mounted for rotation on the shaft 11 and which is inserted, see FIG. 2, between the plate 10 and the concentric capacitor plate rings 12 and 13, as illustrated by the dash line. Dielectric disk 16 is caged or shielded on both sides by a pair of apertured conductive disks indicated in FIG. 5 as 18 and 19. Only a single disk is shown. The two disks cage the dielectric disk 16 and are connected together with the apertures in the disks aligned with each other. Referring more specifically to FIG. 5, each conductive disk includes an outer aperture ring 21 and an inner aperture ring 22 which dimensionally match the rings 12, 13 of FIG. 1B. Apertured rings 21 and 22 alternate with solid conductive portions around a circle; the concentric rings 21 and 22 are offset from another by 180° so that the solid portion of one ring matches the aperture of the other.

FIG. 7 illustrates the placement of the dielectric disk 16 on one of the apertured conductive disks 18 or 19 where the width of the sector or spoke 17 is approximately equal to the elongation of the apertures of rings 21 or 22. Thus, as illustrated in FIG. 8, when the concentric conductive plates of FIG. 1B are placed under the disk of FIG. 7 and with no torque applied, these sectors or spokes 17 occupy one-half of the apertures opposite ring 13 and one-half of the apertures opposite ring 12, namely 22 and 21 (see FIG. 5). Thus, this will provide equal values or balanced capacitances C1 and C2 because of the equal areas of the concentric rings 12 and 13.

FIG. 9 illustrates a maximum torque situation (for one rotational direction), where the inner concentric ring 12 apertures are only minimally covered by spoke 17 and with the outer ring 13 there is maximum coverage. What the foregoing means from an electrical standpoint is that with the dielectric spokes 17 within the metal conductive disk this will serve to shield them from the opposed capacitor plates (see FIG. 2) and will have no influence on the capacities C1 and C2 In other words the metal cage makes the dielectric portion between them invisible. As it moves out of the confines of this cage or shield and into the apertures or openings it will modify the capacities. Thus, with respect to FIG. 9, the outer ring 13 would have the maximum capacity because the dielectric spoke 17 is substantially unshielded and the inner ring 12 has the minimum capacity. These capacities, because of the balanced condition initially shown in FIG. 8, would increase and decrease by the exact same amount. Torque in the opposite direction will result in the opposite covering of the apertures.

Referring now to FIGS. 3 and 4, when the capacitances C1 and C2 are compared, they produce the output voltage $V_T$ and as illustrated in FIG. 4 when there is a balanced condition at, for example, 2.5 volts, this indicates zero torque. A maximum clockwise torque may be slightly less than 5.0 volts and a maximum counter-clockwise torque may be slightly above 0.0 volts.

FIG. 10 is an exploded view showing the individual parts and mechanical assembly of the torque sensor. One of its main applications is a steering torque sensor for the automotive industry. Shaft 11 would extend through all of the components as shown in FIG. 10 as will be explained in more detail in FIG. 11. For the end components there are a housing 26 at the right end and a cover 27 at the left end. Unit 28 is a printed circuit board which contains the two capacitor rings shown in FIG. 1B. It also contains signal conditioning circuitry. The other capacitor ring of FIG. 1A is shown at 10. Finally, there is the dielectric disk 16 which is sandwiched or caged between apertured conductive plates 18 and 19.

Figure 11:
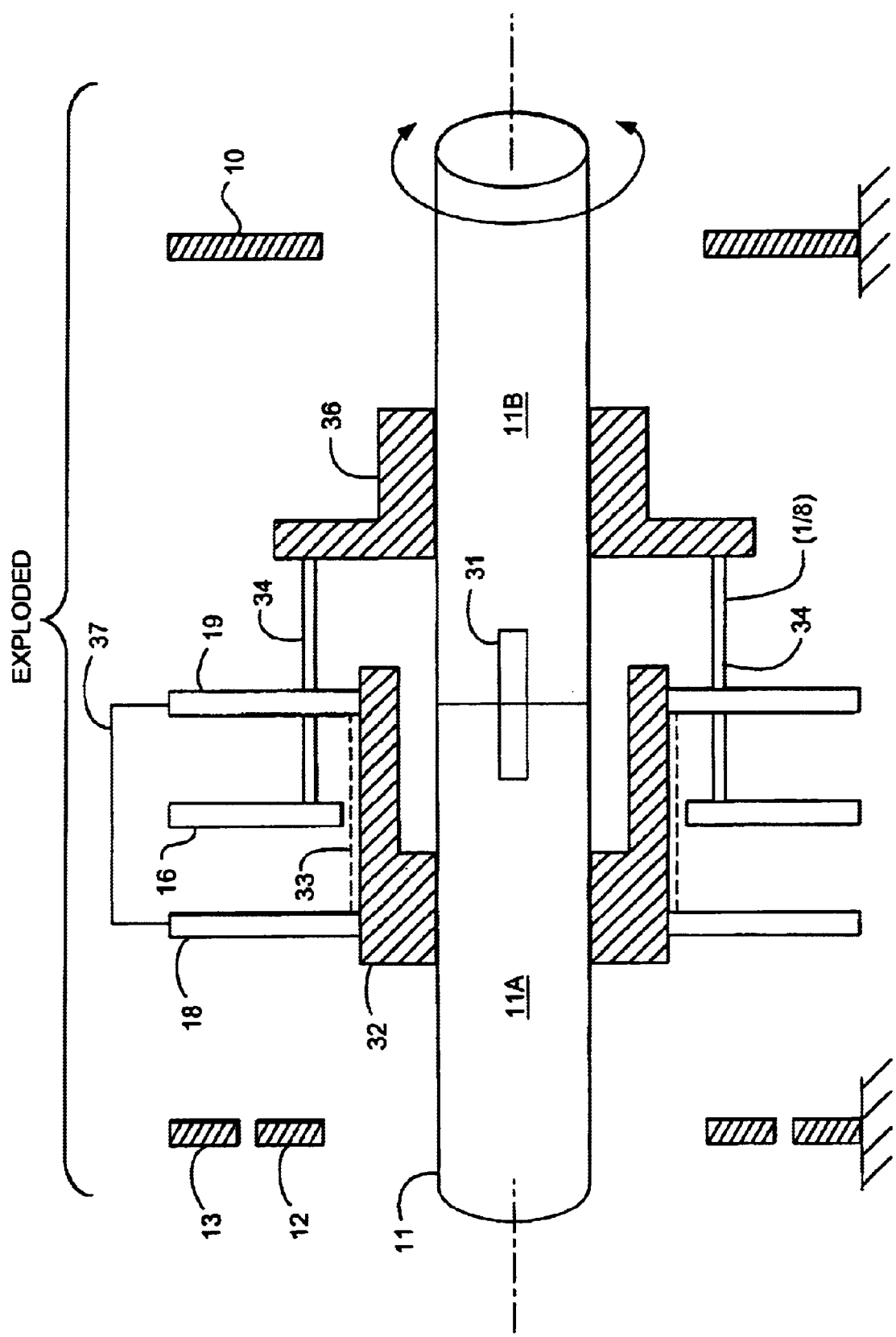
FIG. 11 is a cross-sectional exploded view illustrating in greater detail how the components of FIG. 10 are mounted and interlinked.

FIG. 11 illustrates how all of these parts are fitted together on the shaft 11. The opposed capacitor plates 10 and 12, 13 encircle shaft 11 but do not rotate with it as indicated. The shaft includes a torsion bar 31 which connects a first half 11A of the shaft to a second half 11B. Apertured conductive plates 18 and 19 are mounted together on the collar 32 which is fixed to shaft portion 11A. A pin connects apertured disk 19 to disk 18 so that they rotate together and are kept in alignment. Dielectric disk 16 is mounted via 8 pins 34 to a collar 36 which is affixed for rotation with shaft half 11B. The pins 34 are illustrated both in FIGS. 8 and 9 and are movable in an additional apertured circle 37 in the plates 18 and 19 indicated in FIG. 5. Apertured conductive plates 18 and 19 are electrically connected by the wire 37. They are also insulated from ground.

Thus, in summary the present design for a non-contacting torque sensor can detect changes in capacity for small angles of differential rotation while maintaining that capacity, at a constant torque, through infinite revolutions of the shaft. The specific geometry provides that the capacity between two concentric rings in a common adjacent plate varies in opposing directions. The metallic cage that shields the dielectric rotor presents a constant coupling for the capacitive disk. With the dielectric portion within the cage the effect on total capacity is zero. As the dielectric emerges due to clockwise or counter-clockwise torque from the cage capacity is modified proportionally.

What is claimed is:

1. A differential capacitive torque sensor for a continuously rotating shaft where the shaft is split into first and second halves by a buried torsion bar comprising:

a dielectric disk having a plurality of spokes mounted for rotation with the first half of said shaft;

a pair of first and second apertured conductive disks forming a cage for said dielectric disk and mounted for rotation with the second half of said shaft, said cage shielding portions of said spokes of said dielectric disk in proportion to applied shaft torque;

a pair of concentric capacitor plate rings lying in a common plane, one ring having a greater diameter than the other ring encircling said first half and juxtaposed with said first apertured conductive disk;

an opposed capacitor plate, encircling said second half and juxtaposed with said second apertured conductive disk; each apertured conductive disk including apertures arranged in a pair of concentric rings that match the first and second concentric plate rings, which encircle said first half, said apertures alternating with solid conductive portions around a circle, said concentric rings being offset from one another so that at least part of the solid portion of one ring matches the aperture of the other to provide differential capacitances; and electrical bridge means for comparing the capacitances formed between said pair of concentric rings and said opposed capacitor plate for determining said applied shaft torque.

2. A torque sensor as in claim 1 where said apertured conductive disks have identical aperture patterns which are aligned with each other.

3. A torque sensor as in claim 1 where said apertured conductive disks are electrically connected together.

4. A torque sensor as in claim 1 where said concentric plate rings have equal areas.

5. A torque sensor as in claim 1 where said offset is 180 degrees.

6. A torque sensor as in claim 1 where said plurality of spokes radially extend to cover at least a portion of an aperture on each concentric ring, depending on applied torque, whereby the dielectric parameters of said capacitances are determined.

7. A torque sensor as in claim 6 where under zero torque conditions substantially one half of each aperture is covered by each spoke to provide equal values of capacitance.

8. A torque sensor as in claim 6 where when applied torque is a maximum in one rotational direction the apertures of one ring are substantially covered and the other ring apertures minimally covered and with applied maximum torque in the opposite direction the opposite covering of apertures occurs.

* * * * *